Aug. 18, 1942.    C. F. ENGELHARDT    2,293,682
PISTON RING
Filed Jan. 25, 1941    2 Sheets-Sheet 1

INVENTOR.
Carl F. Engelhardt
BY Leonard L. Kalish

INVENTOR.
CARL F. ENGELHARDT
BY Leonard L. Kalish

Patented Aug. 18, 1942

2,293,682

UNITED STATES PATENT OFFICE 2,293,682

PISTON RING

Carl F. Engelhardt, Yeadon, Pa., assignor to Wilkening Manufacturing Company, Philadelphia, Pa., a corporation of Delaware Application January 25, 1941, Serial No. 375,916

3 Claims. (Cl. 309—45)

The present invention relates to a self-expanding piston ring and it relates more particularly to a self-expanding piston ring which is preferably made of sheet metal, and so formed, constructed, and arranged as to present two relatively narrow parallel annular cylinder-contacting sealing surfaces composed of a multiplicity of sector-like sections, disposed end to end in close proximity to each other so as to constitute more or less continuous annular cylinder-contacting surfaces with but a very small gap between the sectors, and spring means forming an integral part of the piston ring and also preferably formed of the same sheet metal of which the cylinder-contacting elements are formed, thereby to tend to expand the ring tangentially or circumferentially with a resultant radially outward expansion of the component cylinder-contacting elements thereof.

The piston ring of the present invention may be used both for oil control purposes in the bottom ring-receiving groove of a piston which has apertures through the piston wall for oil drainage and may also be used in the upper ring-receiving grooves without any oil drain holes through the piston wall, for compression purposes.

For the purpose of illustrating the invention, there is shown in the accompanying drawings a form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings in which like reference characters indicate like parts:

Figure 5:
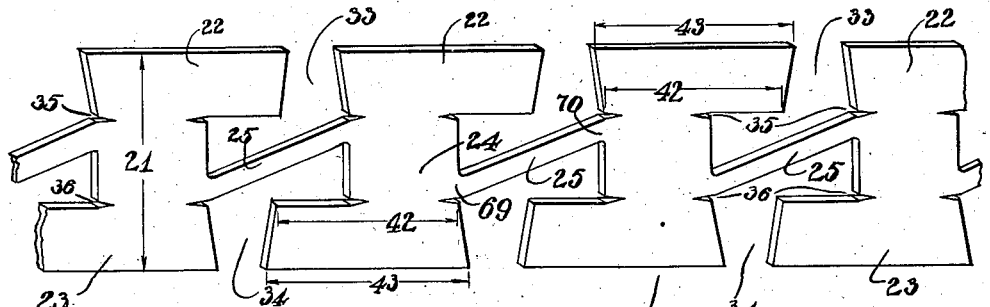

Figure 5 represents a perspective view of a fragmentary portion of a sheet metal blank in its flat condition of which the piston ring of the present invention may be formed, but before the cylinder-contacting elements 22 and 23 have been bent over and before the spring-forming elements 25 thereof have been formed or shaped into the springs 51 intervening the cylinder-contacting elements 22 and 23.

Figure 7:
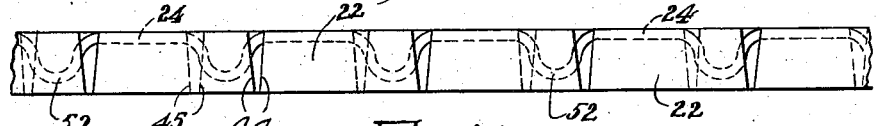
Figure 6:
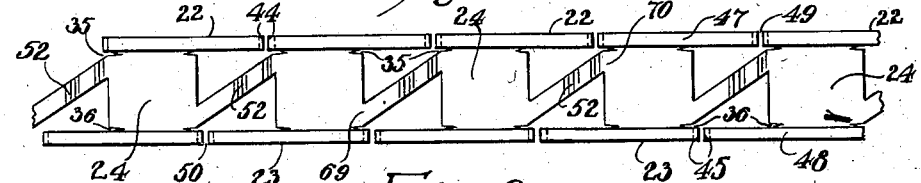

Figures 6 and 7 represent a front view and a top elevational view, respectively, of a fragmentary portion of a strip of piston ring material like that shown in Figure 5, but after the cylinder-contacting element 22 and 23 have been bent over and after the intervening spring-forming portions 25 have been partially collapsed, but before the strip has been completely formed into the arcuate formation by the further collapsing of said springs 51.

Figure 8:
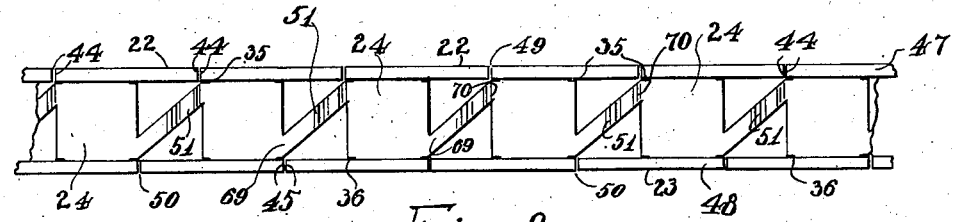
Figure 9:
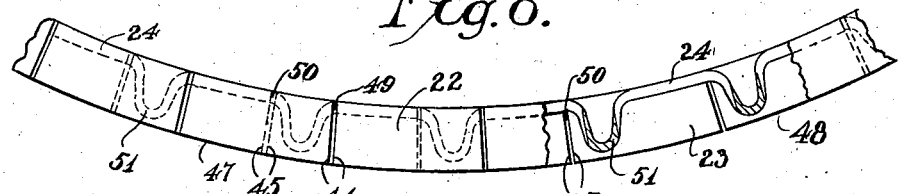

Figures 8 and 9 represent a front elevational view and a top plan view, respectively, similar to that shown in Figures 6 and 7, but after the strip has been formed into the generally arcuate form corresponding generally to the curvature of the cylinder in which the piston ring is to be used, by further collapsing the spring members 51 and by bringing the juxtaposed radial edges 44 and 45 of the cylinder-contacting elements 22 and 23 into corresponding proximity to each other.

One form or embodiment of the present invention is illustrated in Figures 1 to 9 inclusive, the formation of which is illustrated in Figures 5 to 9 inclusive.

Thus, in this embodiment of the present invention, a flat sheet-metal strip 20 of suitable thickness having an aggregate width 21, is cut out in the general manner indicated in the Figure 5, to form juxtaposed upper and lower, generally sector-shaped, cylinder-contacting elements 22 and 23 with intervening, connecting, spacer portions 24 and with spring-forming portions 25.

The spring-forming portions 25 are relatively thin strips of metal (as shown in Figure 5) and extend diagonally between adjacent connecting spacer portions 24. That is, as shown in Figure 5, said spring-forming portions 25 extend from the lower side edge 69 of one of said connecting spacer portions 24 to the upper side edge 70 of the adjacent spacer portion 24. While Figure 5 shows a structure in which the lower side edge connection 69 is formed at the right-hand side of each spacer portion 24 and in which the upper side edge connection 70 is formed at the left-hand side of each spacer portion 24 it is understood and intended that the connections could be made oppositely without departing from the spirit of the present invention. That is, the lower connection 69 could be made at the left-hand side and the upper connection 70 could be made at the right-hand side of each spacer portion 24.

Slits 35 and 36 are formed at the junction of the spacer portion 24 with the cylinder-contacting elements 22 and 23 respectively in order to permit said cylinder-contacting elements 22 and 23 more readily to be bent into their final form.

Figures 3, 4:
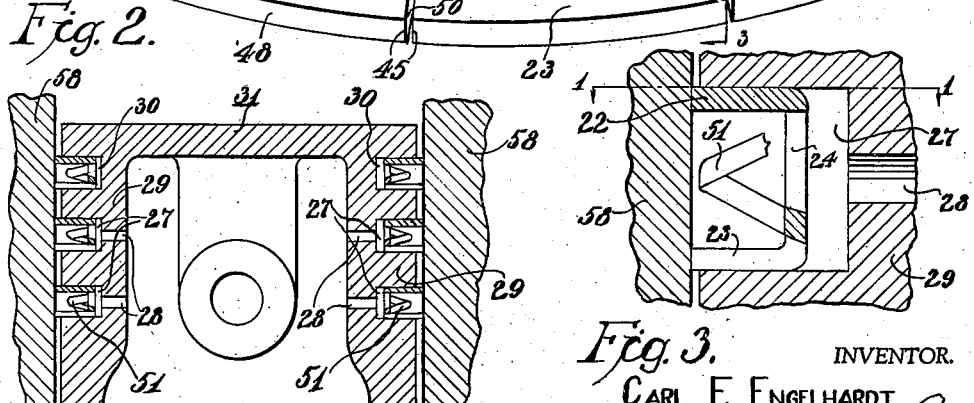
Figure 3 represents a section on line 3—3 of Figure 2.
Figure 4 represents a sectional view of the upper portion of a piston showing the piston ring of the present invention disposed in each of the three ring-receiving grooves thereof.

By reason of the fact that the spring-forming element 25 when finally made into the spring member 51 in the final piston ring, will occupy only a relatively small portion of the total area of the back wall, said back wall will be in most part an opening beneath said spring member 51. This aperture is advantageous when the piston ring is used for oil control purposes in one or two of the lower ring-receiving grooves 27 of a three-groove piston such as is illustrated in Figure 4, or of a four-groove piston wherein the lowermost or the lower two ring-receiving grooves are provided with oil drain holes 28 extending through the piston wall 29 for oil draining purposes. The piston ring may also be used unchanged for compression purposes in the uppermost ring-receiving groove 30 of the piston 31 (or in the upper two ring-receiving grooves) as shown in Figure 4.

Figure 1:
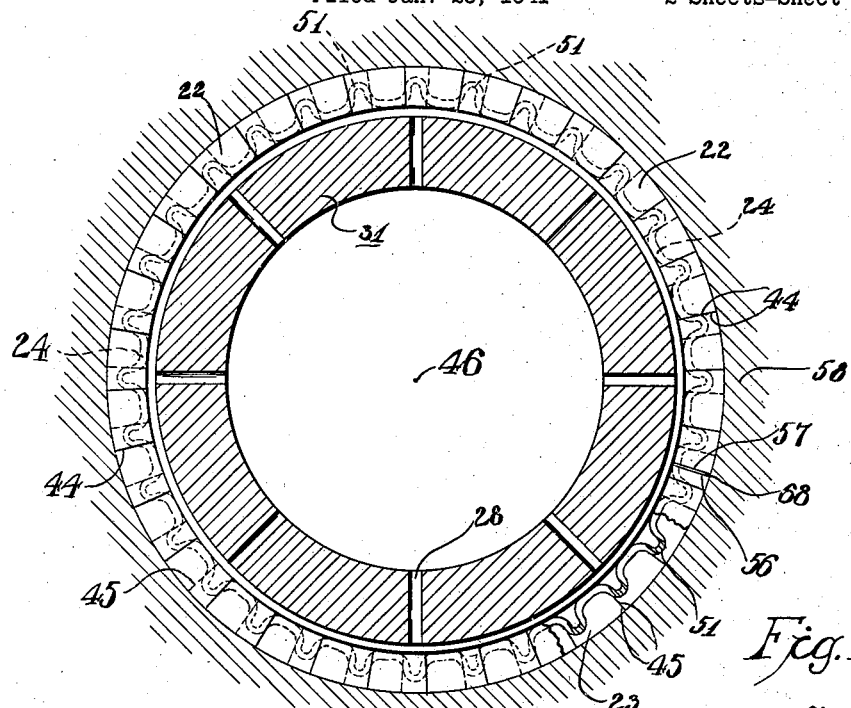
Figure 1 represents a top plan view of a piston ring embodying the present invention as shown installed in a piston disposed within a cylinder, which is generally on line 1—1 of Figure 3 (the parts not being in true proportion, for purposes of better illustration.)
Figure 2:
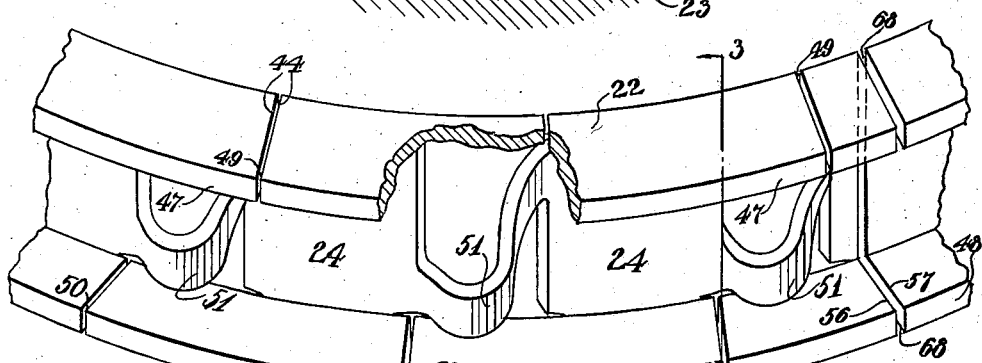
Figure 2 is a perspective view of a fragmentary portion of the piston ring of the present invention on a much enlarged scale with a portion broken away better to expose to view some of the internal details of construction.

The longitudinal or circumferential width of the cylinder-contacting portions 22 and 23 is slightly smaller in the base dimension 42 than in the end dimension 43 or in the circumferential dimension 43, this difference being so calculated that when the cylinder-contacting elements 22 and 23 have been bent over and have been brought generally edge-to-edge as indicated in Figures 1, 2 and 9, the juxtaposed edges 44 and 45 will parallel each other and will be disposed as radii in relation to the axis or center 46 of the piston.

The peripheral or cylinder-contacting edges or surfaces 47 and 48 of the cylinder-contacting elements 22 and 23, respectively, may also be given a slightly convex arcuate curvature between the ends thereof corresponding to the curvature of the cylinder in which the piston ring is intended to be used, so that when the cylinder-contacting elements 22 and 23 are placed side by side in close proximity as indicated in Figures 1, 2 and 9, the successive, adjacent, cylinder-contacting surfaces 47 and 48, respectively, will form corresponding true circles matching the circle of the cylinder.

The formation of the blanks shown in Figure 5 may be accomplished by punching operations on any suitable punch press, either manual or semi-automatic, or fully automatic, with suitable dies and punches either by step-by-step or progressive punching operations. However, if desired, the blanks shown in Figure 5 may also be formed by milling out the portions 33 and 34 or by cutting out the portions 33 and 34 on a shaper or on a broaching machine. If the portions 33 and 34 are to be cut out on a milling machine or on a shaper or on a broaching machine, several sets may be stacked together and may be milled, shaped or broached all together gang-wise.

The piston ring is formed by bending over towards each other the juxtaposed cylinder-contacting elements 22 and 23 so that they more or less parallel each other as indicated in Figures 6, 7, 8 and 9 and also in Figure 2 and by corrugating or bending the spring-forming elements 25 in a generally radial direction to form a series of spaced corrugation-like or loop-like springs 51.

The formation of the piston ring from the blank shown in Figure 5 may be accomplished by successive bending operations performed in any suitable sequence where all the bending operations may be done more or less simultaneously to produce the result indicated in Figures 1, 2, 8 and 9. In Figures 6, 7, 8 and 9, however, I have illustrated what may be one desirable sequence of bending or forming operations although it is to be understood that this sequence may be changed, or the bending or forming operations may all be accomplished more or less simultaneously by suitable automatic or semi-automatic bending and forming jigs or fixtures or machines.

Thus, for instance, in Figures 6 and 7, I have illustrated what may be an initial stage in the formation of the piston ring wherein the cylinder-contacting elements 22 and 23 have been bent over to parallel each other and wherein the spring-forming portions 25 have been bent into an initial partially-closed formation 52 preliminary to their formation into the more closed spring 51 shown in Figures 8 and 9. In this condition, the piston-ring-forming strip would be generally straight as indicated in Figure 7, with the juxtaposed edges 44 and 45 substantially separated from each other and in non-parallel relation. Thereafter, the partially-closed formations 52 may be collapsed somewhat to form the more nearly closed springs 51. By this final collapsing operation the piston ring strip is formed in a generally arcuate shape indicated in Figure 9 generally corresponding to the curvature of the cylinder in which the piston ring is to be used.

In the commercial manufacture of piston rings according to the present invention, the blank shown in Figure 5 as well as the corresponding piston ring strips shown in Figures 6, 7, 8 and 9 may be formed more or less continuously in relatively great lengths from which smaller pieces may then be cut off after the strip has been completely formed or shaped into the form shown in Figures 6 and 7, or even after it has been formed into the curved shape shown in Figures 8 and 9. The length of the individual pieces would correspond more or less accurately to the circumferential dimension of the piston ring desired. For the different sized piston rings the other dimension would also be varied to accord with the width of the ring-receiving groove, the depth of the ring-receiving groove, and the diameter of the piston.

Thus, for instance, the individual pieces corresponding to the circumferential length of the piston ring could be cut off while the strip is straight as in Figures 6 and 7 and then the shorter piece curved and completed to the form shown in Figures 8 and 9 and in Figures 1 and 2, or the strip can be curved while it is still part of the whole piece of considerable length and formed into a generally spiral formation as it is being curved and thereafter individual pieces cut off corresponding to the circumferential length of the desired diameter.

In making the piston ring, the spring members 51 are collapsed until the juxtaposed edges 44 meet each other or abut each other and until the edges 45 likewise meet or abut each other, thereby producing the curved shape. However, when the compression pressure is released, the spring members 51 open up slightly or spring back slightly so that the edges 44 and 45 separate from each other slightly as indicated in Figures 2, 8 and 9. However, the circumferential length of the piston ring is so adjusted that when the free ends 56 and 57 of the piston ring abut each other and the ring is compressed circumferentially or tangentially into the diameter of the cylinder 58, the radial edges 44 and 45 of the cylinder-contacting elements 22 and 23, respectively, will generally abut each other or will have but a very small clearance between them. It is estimated that the total or aggregate of all clearance between the successive pairs of edges 44 in the entire circumference or between the successive pairs of edges 45 in the entire circumference may be a few thousandths of an inch, perhaps .003" to .007", more or less (that is, an amount perhaps no greater than the clearance at the gap in an ordinary piston ring); it being understood that at the gap or break 68 there would be substantially no clearance as the edges 56 and 57 will abut each other. Thus, by reason of the fact that each of the bends or spring members 51 tends to open up slightly after the ring has been compressed into the cylinder as is indicated in Figure 1, there is a uniformly distributed, tangential or circumferential force between successive sections of the piston ring, that is, between successive or adjacent cylinder-contacting elements 22 and 23, respectively, and this force is in turn translated into an outward radial component force tending to force each of the cylinder-contacting elements radially outward and tending to press the cylinder-contacting edges 47 and 48 thereof into firm contact with the cylinder wall with a uniformly distributed and predetermined radial force. By reason of the fact that each pair of cylinder-contacting elements 22 and 23 is free to move radially inward or outward, more or less independently of other pairs of elements, the ring is capable of adjusting itself to irregularities in the cylinder wall, such as are produced by prolonged operation of the motor. As a result, the piston ring of the present invention is more efficient in preventing loss of power ordinarily resulting from irregularities in the cylinder wall and is, in addition, more efficient in preventing leakage of oil through such irregularities up into the combustion chamber of the cylinder, thereby materially reducing oil consumption in such worn motors.

It will be noticed that in the final piston ring the cylinder-contacting elements 22 and 23 extend radially outward beyond the spring member 51 so that said spring member 51 does not contact the cylinder wall in the finally assembled piston.

The cylinder-contacting elements 22 and 23 are preferably so formed that they extend in circumferentially opposite directions from each other; that is, in the finally completed piston ring, the cylinder-contacting element 22 may extend in a counter-clockwise direction from its point of junction with the intervening spacer portion 24 while the lower cylinder-contacting element 23 extends in a clockwise direction from its point of junction with the intervening spacer portion 24 or vice versa. In this way, the openings 49 between the edges 44 of adjacent upper cylinder-contacting elements 22 are circumferentially staggered in relation to the openings 50 between the edges 45 of adjacent lower cylinder-contacting elements 23.

It is possible, however, to form said cylinder-contacting elements 22 and 23 in other ways so as to produce a greater or lesser staggering between the respective openings 49 and 50. For example, both the upper and lower cylinder-contacting elements 22 and 23 may extend circumferentially in both directions from the point of junction with the intervening spacer portion 24 to produce a generally T-shape as distinguished from the general L-shape shown in Figures 1 to 9 inclusive and to give little or no stagger between the openings 49 and 50.

The staggering between openings 49 and 50 is desirable as tending to minimize any possible "blow-by."

In the manufacture of the piston ring of the present invention, I may also grind-finish the cylindrical periphery 59 of the completed ring by clamping the finished ring axially between suitable supporting discs upon a suitable mandrel or any suitable fixture, while the ring is generally fully compressed, and then grinding the periphery 59 to match the cylinder, by rotating the ring about its axis against a revolving grinding wheel. If desired, a number of piston rings may be so clamped and held side by side on the same fixture or on the same mandrel between the same clamping discs or blades, so that they may be ground altogether to match the cylinder.

The gap or break 68 in the piston ring may be formed through the pair of juxtaposed cylinder-contacting elements 22 and 23 as indicated in Figures 1 and 2.

The piston ring of the present invention is highly effective both for oil control as well as for compression, and may be used without any separate expander spring and will produce a suitably high cylinder-contact pressure per unit of area between the cylinder-contacting surfaces of the piston ring and the cylinder wall. However, the resilient strength of the spring member 51 is adjusted to prevent too-high cylinder-contact pressure so that there will be no scoring of the cylinder wall and so that there will be little variation in the pressure of sizes ranging from standard diameter to slightly oversize (.060 oversize, for example).

The piston ring of the present invention is preferably made of sheet steel of suitable consistency or suitable hardness although it may be made of other sheet metals, such as sheet bronze or sheet brass or other suitable alloy, both ferrous or non-ferrous. If the piston ring is made out of sheet steel, it may be formed out of fully annealed sheet steel but one capable of being subsequently hardened and tempered to a suitable degree of hardness and also to impart a suitable degree of resiliency to the spring members 51. Thus, for instance, the blank shown in Figure 5 may be formed while the metal is completely annealed and the formation shown in Figures 6 and 7 and even the formation shown in Figures 8 and 9 may be made while the metal is fully annealed, although these formations may also be formed with a certain amount of hardness setting into the metal by suitable hardening and tempering. The final hardening and tempering, however, should preferably be done before the cylinder-contacting circumference of the completed ring is grind-finished or otherwise finished to the cylinder diameter.

The piston ring of the present invention is particularly efficient in preventing an excessive pressure upon and scoring of the cylinder wall and in providing a high degree of oil drainage. As described hereinbefore, that portion of the back wall directly opposite each of the spring-forming members 51 is completely open and the piston ring thereby permits of very efficient drainage of oil therethrough.

The spring members 51, as shown particularly in Figure 2, are relatively thin strips integrally connecting adjacent spacer portions 24. Said spring members 51 may be formed as loops extending radially outward from said spacer portions 24 axially intermediate said upper and lower cylinder-contacting elements 22 and 23. Said spring members 51 have a generally spiral form since their points of connection with adjacent spacer portions 24 are placed on opposite sides of the axially central line of said piston ring; that is, the connection to one spacer portion 24 is below the axially central line of the piston ring while the connection to the next adjacent spacer portion is above the axially central line of said piston ring. While the embodiment in Figure 4 shows a construction in which the left portion of the spring 51 is below the central line and the right portion of said spring member is above the central line, it is possible, as previously discussed, to reverse this so that the left portion of the spring member 51 is above the central line and the right portion below. It is also possible to have other variations in the manner of forming said spring members 51. Thus, for example, alternate spring members may be given an upward counter-clockwise spiral formation, while the remaining alternate spring members are given a downward counter-clockwise spiral formation.

It is also possible to have a structure in which some but not all of the spring members are given a spiral formation while the remaining spring members are formed as loops which lie in a single radial plane.

It is also possible to have two or more of said spirally-formed spring members between each pair of spacer portions 24. Where two or more spring members are formed between each pair of spacer portions, it is possible to have said spring members parallel or non-parallel.

It is possible also to form said spring members as loops extending radially inward from said spacer portions 24 (as distinguished from the radially outward extending loops shown in Figures 1 to 4 inclusive). In this latter case the spring members would lie radially inward of the cylinder-contacting elements 22 and 23 (instead of tacting elements 22 and 23 as shown in Figures 1 to 4 inclusive). In this latter case the spring members would lie radially inward of the cylinder-contacting elements 22 and 23 (instead of being axially intermediate said cylinder-contacting elements 22 and 23 as shown in Figures 1 to 4 inclusive).

The above illustrations are given by way of example only and are not intended to be, in any way, a limitation of the manner in which said spring members 51 may be formed. The present invention is directed to a self-expanding piston ring including spring members whose ends do not lie in the same radial plane.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A one-piece flexible self-expanding piston-ring comprising a central corrugated annulus composed of alternating crests and troughs of spring material, a pair of more or less parallel integrally formed extensions projecting radially outward from each of said troughs, said extensions being formed in close proximity to each other to provide a pair of more or less continuous axially-displaced annular cylinder-contacting ribs, each of said crests being formed as a relatively narrow strip extending more or less helically and sinuously between adjoining troughs, one end of said strip connecting with its adjoining trough at a point below the center transverse plane of the piston-ring, the other end of said strip connecting with its adjoining trough at a point above the center transverse plane of said piston-ring.

2. A one-piece flexible self-expanding piston-ring fabricated from a strip of resilient sheet material and including a series of circumferentially-arranged bent and folded sections, U-shaped in radial cross-section and each providing an open front and a perforated back wall member, and spring loops connecting corresponding wall members of said sections, each of said spring loops extending generally radially of the ring and being spirally formed, one end of each of said loops connecting with its adjoining wall member at a point below the center transverse plane of said piston-ring, the other end connecting with its adjoining wall member at a point above the center transverse plane of said piston-ring.

3. A one-piece flexible self-expanding piston-ring comprising a series of sections having top and bottom walls and a back wall, said sections being disposed in close circumferential proximity whereby the top and bottom walls provide a pair of more or less continuous axially-separated annular cylinder contacting ribs, the back walls being circumferentially spaced from each other to provide oil-drain openings therebetween, and loops of spring metal connecting the side edges of adjacent back walls and spanning said oil-drain openings, each of said loops extending radially outward axially-intermediate said top and bottom walls, each of said loops being spirally formed, one end of each of said loops connecting with its adjoining back wall at a point below the center transverse plane of the piston-ring, the other end of each of said loops connecting with its adjoining back wall at a point above the center transverse plane of said piston-ring.

CARL F. ENGELHARDT.